(12) United States Patent
Cheng et al.

(10) Patent No.: US 8,218,073 B1
(45) Date of Patent: Jul. 10, 2012

(54) AUTO FOCUS MODULE FOR A WEBCAM

(75) Inventors: Bill Cheng, Fremont, CA (US); Ivan Ho, Fremont, CA (US); T. J. Hsu, Hsinchu (TW)

(73) Assignee: Logitech Europe S.A., Morges (CH)

( * ) Notice: Subject to any disclaimer, the term of this patent is extended or adjusted under 35 U.S.C. 154(b) by 540 days.

(21) Appl. No.: 12/020,471

(22) Filed: Jan. 25, 2008

(51) Int. Cl.
*H04N 5/225* (2006.01)
(52) U.S. Cl. ........................................ 348/374
(58) Field of Classification Search ................ None
See application file for complete search history.

(56) References Cited

U.S. PATENT DOCUMENTS

| | | | |
|---|---|---|---|
| 5,302,778 A * | 4/1994 | Maurinus | 174/521 |
| 5,855,343 A * | 1/1999 | Krekelberg | 248/121 |
| 6,262,887 B1 * | 7/2001 | Lee | 361/679.27 |
| 6,731,340 B1 * | 5/2004 | Lai | 348/373 |
| 6,738,094 B1 * | 5/2004 | Minami et al. | 348/373 |
| 6,970,202 B1 * | 11/2005 | Glogan et al. | 348/373 |
| 7,088,397 B1 * | 8/2006 | Hunter et al. | 348/374 |
| D577,754 S * | 9/2008 | Leung et al. | D16/202 |
| 2006/0228103 A1 * | 10/2006 | Go | 396/268 |
| 2007/0019950 A1 * | 1/2007 | Tanaka | 396/462 |
| 2007/0115565 A1 * | 5/2007 | Shyu et al. | 359/811 |
| 2007/0253703 A1 * | 11/2007 | Tsai et al. | 396/429 |
| 2007/0297788 A1 * | 12/2007 | Wahl et al. | 396/419 |
| 2008/0239134 A1 * | 10/2008 | Hsu | 348/333.06 |

* cited by examiner

*Primary Examiner* — Sinh Tran
*Assistant Examiner* — Jason Flohre
(74) *Attorney, Agent, or Firm* — Kilpatrick Townsend & Stockton LLP

(57) ABSTRACT

A webcam includes an external housing; a lens system disposed in the external housing; and a lens cap disposed in the external housing and configured to at least partially surround the lens system, wherein a gap is formed between the lens system and the lens cap.

13 Claims, 3 Drawing Sheets

AUTO FOCUS MODULE FOR A WEBCAM

BACKGROUND OF THE INVENTION

The present invention generally relates to web cameras. More particularly the present invention relates to a cap apparatus and method for protecting the delicate auto focus elements of a web camera during manufacture.

Web cameras (or webcams) are cameras that are configured to collect video or still images for transmission over a network, such as the Internet. The collected video can be used in instant messaging, video conferencing, video broadcasting or the like. Webcams may be network enabled for direct transmission of video to a network, such as the Internet, or may be configured for use with a personal computer or other dedicated electronic equipment, which transmits captured video to a network. Webcams may be configured to transmitted collected video to a web server via a network continuously or at intervals.

Webcams often include focusing elements that might be configured to auto focus on scene. These focusing elements often include delicate springs, motor drives and the like to perform auto focusing. During the manufacture of a webcam, before an outer protective case is placed on the webcam, the webcam's delicate focusing element are exposed to contact and can be easily damages by being bumped for dropped. Further, the webcam is susceptible to being damaged from dust particles or other particle collecting on the webcam's image sensor when the image sensor is exposed during manufacture.

To increase the yield of usable-undamaged webcams during manufacture, new webcams are needed that include self protective features configured inhibit damage.

BRIEF SUMMARY OF THE INVENTION

The present invention generally relates to web cameras. More particularly the present invention relates to a cap apparatus and method for protecting the delicate auto focus elements of a web camera during manufacture.

According to one embodiment of the present invention, a webcam includes an external housing; a lens system disposed in the external housing; and a lens cap disposed in the external housing and configured to at least partially surround the lens system, wherein a gap is formed between the lens system and the lens cap. The lens system includes a lens and the lens cap has an aperture formed therein proximate to the lens and configured to pass light through the aperture to the lens.

According to a specific embodiment, the lens cap includes a coupling system to couple the lens cap to the lens system. The coupling system may include a set of hooks to couple the lens cap to the lens system.

According to another embodiment of the present invention, a webcam includes an external housing; and a lens system disposed in the external housing. The lens system includes: i) a printed circuit board (PCB), ii) an image sensor mounted on the PCB, and iii) an auto focus actuator mounted on the PCB. The PCB includes a plurality of apertures formed therein, and the auto focus actuator includes a plurality of screw bosses configured to fit into the apertures and inhibit particles from the screw bosses from falling on the image sensor as the auto focus actuator is mounted to the PCB.

According to a specific embodiment, the screw bosses have a height that is less than a depth of the apertures. A void is created by the screw bosses fitted into the apertures and the void is configured to collect debris from the screw bosses as screws are screwed into the screw bosses.

A better understanding of the nature and advantages of the present invention may be gained with reference to the following detailed description and the accompanying drawings.

DETAILED DESCRIPTION OF SELECT EMBODIMENTS

The present invention provides a webcam and more particularly provides a webcam having a cap apparatus configured to protect the delicate auto focus elements of the webcam during manufacture.

Figure 1:
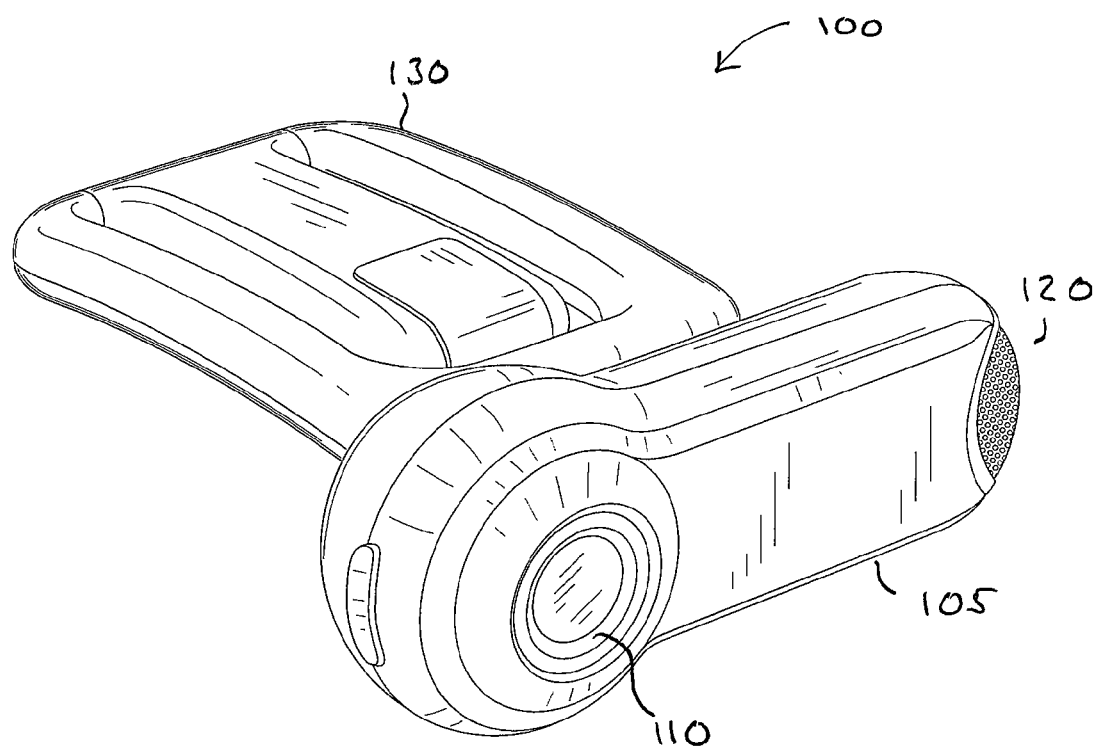
FIG. 1 is a simplified diagram of a webcam according to one embodiment of the present invention.

FIG. 1 is a simplified diagram of a webcam 100 according to one embodiment of the present invention. Webcam 100 includes a housing 105 that houses the components of the webcam. The webcam may include a lens system 110 for collecting light from a scene for video image generation of the scene. A scene is generally the environment that the lens system of the webcam collects light from or "looks at." The webcam may also include a microphone 120 for collecting sound with the video images, and may include a mount 130 for standing the webcam on a desk or for attaching the webcam to a monitor, laptop computer or the like.

Figure 2:
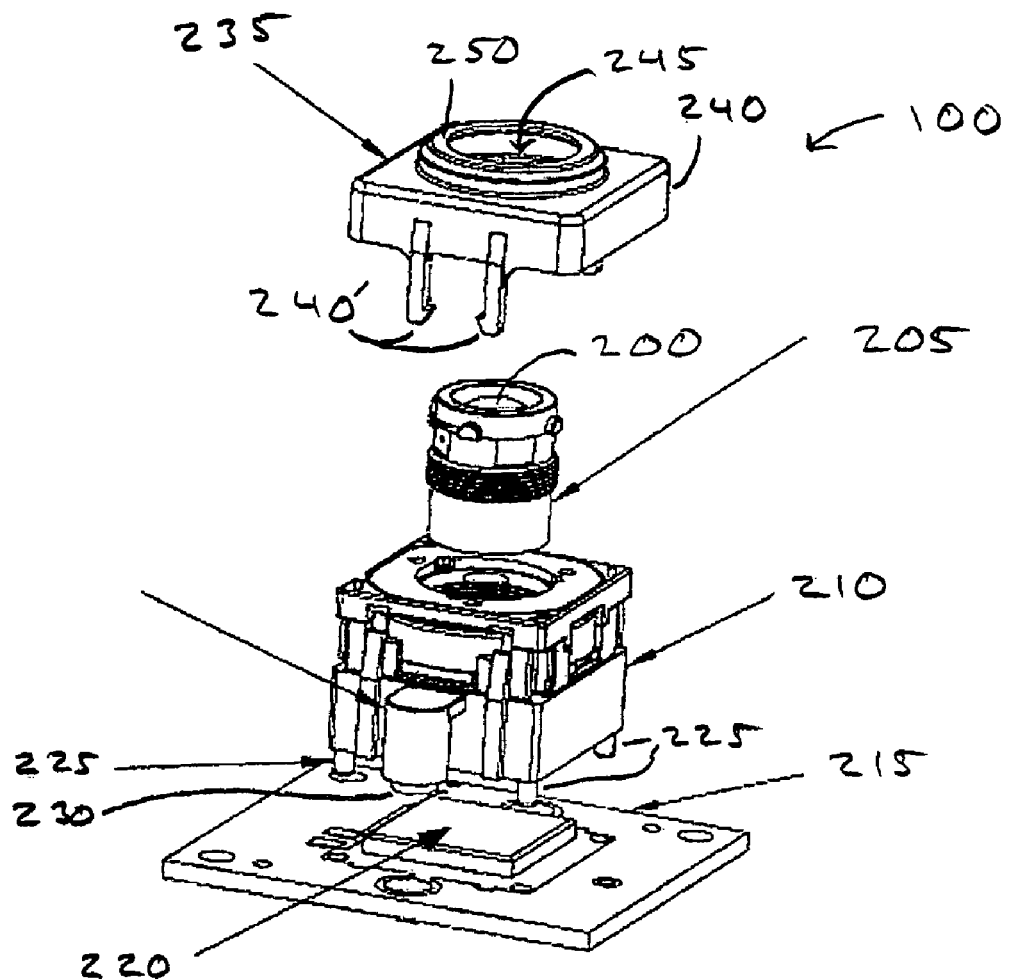
FIG. 2 is a further detailed image of lens system according to one embodiment of the present invention.

FIG. 2 is a further detailed image of lens system 100. Lens system 100 includes a lens 200 disposed in a lens housing 205. The lens housing may be configured to be mounted in a auto focus actuator 210 configured to adjust the lens to focus on a scene. The auto focus actuator may include various mechanical and electronic elements for effecting auto focus. The various mechanical and electronic elements might include a spring (not shown) to push the lens smoothly from the auto focus actuator and/or to return the lens into auto focus actuator to effect focus. The mechanical and electronic elements might further include a stepper motor (not shown) or the like to further provide for movement of the lens in the auto focus actuator for focusing.

Lens system 100 may also include a printed circuit board (PCB) 215 to which a image sensor 220 may be coupled. Lens 200 may be configured to focus light from a scene onto image sensor 220. Image sensor 200 may be a CCD array, a CMOS array or the like and may be configured to digitize images of a scene from light collected by the image sensor.

Auto focus actuator 210 may include one or more a sensor-holder screw bosses 225. Each sensor-holder screw boss is configured to receive a screw, which passes through the PCB, to hold the sensor-holder screw boss to the PCB. Auto focus actuator 210 may also include one or more a sensor-holder bosses 230 configured to provide alignment of the auto focus actuator 210 to the PCB and the image sensor. These bosses are described in further detail below.

According to one embodiment of the present invention, lens system 100 includes a lens cap 235. Lens cap 235 is an "internal" cap that is inside housing 105. The lens cap includes a body 240. An aperture 245 may be formed in body 240 at a top portion of the body. The aperture is formed in a portion of the lens cap at which lens 200 is configured to collect light through. According to at least one embodiment, an annular ring 250 surrounds the aperture formed in the body. Annular ring 250 may be configured to at least partially lie "outside" of housing 105.

Figure 3:
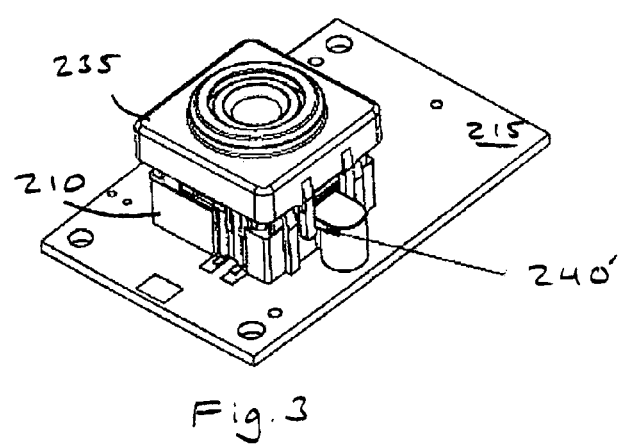
FIG. 3 is a simplified diagram showing the lens cap coupled to the auto focus actuator.

FIG. 3 is a simplified diagram showing lens cap 235 coupled to auto focus actuator 210. The lens cap may be coupled to the auto focus actuator via a set of hooks 240' which compose a portion of body 240. See FIGS. 2 and 3. While hooks 240' are shown in FIG. 3 as being coupled to auto focus actuator 210, the hooks may be coupled to PCB 215 or other structure. According to one embodiment, the lens cap is configured to at least partially surround lens 200 and auto focus actuator 210. According to another embodiment, the lens cap is configured to surround lens 200 and auto focus actuator 210 excluding the portion of the lens that is configured to collect light through the aperture formed in the lens cap. According to one embodiment, the lens cap is further configured not to directly contact the lens housing and/or the auto focus actuator. That is, an air gap lies between the lens cap and the lens housing and/or the auto focus actuator.

The lens cap is configured to protect the lens system from being damaged if the lens system is touched during the manufacture of the webcam. For example, if the lens system is bumped or dropped during manufacture of the webcam, the lens cap is configured to absorb at least a portion of the shock from the bump or drop and limit the amount of shock transferred to the lens and auto focus actuator. Limiting the shock that is transferred to the lens and auto focus actuator limits or eliminates damage that might occur to the lens and/or the auto focus actuator and particularly to the relatively delicate mechanical and electrical components of the auto focus actuator that are configured to move the lens. The lens cap may further add protection to the finished webcam while in use, for example, by a user. For example, if the finished webcam is used by a user and is bumped or dropped, the housing 105 (see FIG. 1) may flex and contact the lens cap which is configured to eliminate or limit the amount of shock that is transferred from the housing through the lens cap and to the auto focus actuator.

Figure 4:
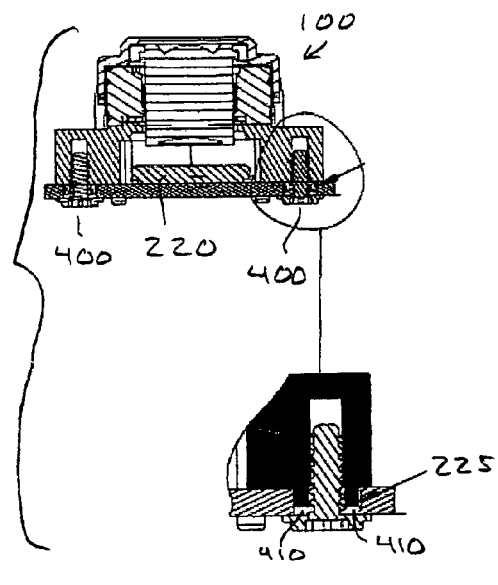
FIG. 4 is a simplified cross sectional view of the lens system according to one embodiment of the present invention.

FIG. 4 is a simplified cross sectional view of lens system 100 according to one embodiment of the present invention. As shown in FIG. 4, sensor-holder screw bosses 225 are configured to extend into apertures formed in PCB 215. The extension of sensor-holder screw bosses 225 in the apertures in the PCB inhibit particles from falling onto image sensor 220. Specifically, as screws 400 are screwed into the sensor-holder screw bosses, plastic particles tend fall off of the bosses as the screws are screwed in. As the sensor-holder screw bosses extend into the apertures, the sensor-holder screw bosses inhibit the plastic particles from reaching the top surface of the PCB on which the image sensor is mounted. According to a further embodiment, the sensor-holder screw bosses have a height that is less than the thickness of the PCB. That is, with the auto focus actuator mounted on the PCB, the sensor-holder screw bosses extend into the top portion of apertures and leave a bottom portion of the apertures into which the sensor-holder screw bosses do not extend. With the screws screwed into the sensor-holder screw bosses, a void 410 remains between the screw heads and the sensor-holder screw bosses where the void collects and hold the plastic particles that fall from the bosses as the screws are screwed into the bosses, which further inhibits the plastic particle from falling onto the image sensor.

It is to be understood that the examples and embodiments described above are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. A webcam comprising:
an external housing;
a lens system disposed in the external housing and including:
a lens including a portion that is configured to collect light,
a printed circuit board (PCB),
an image sensor mounted on the PCB, and
an auto focus actuator mounted on the PCB; and
a lens cap disposed in the external housing and configured to surround the lens system, wherein a gap is formed between the lens system and the lens cap, and between the auto focus actuator and the lens cap, and
wherein the external housing has an exterior surface and the lens cap includes an annular portion that is configured to extend at least partially beyond the exterior surface.

2. The webcam of claim 1, wherein the lens cap has an aperture formed therein proximate to the lens and configured to pass light through the aperture to the lens.

3. The webcam of claim 2, wherein the lens cap includes a coupling system to couple the lens cap to the lens system.

4. The webcam of claim 3, wherein the coupling system includes a set of hooks.

5. The webcam of claim 1, wherein:
the PCB includes a plurality of apertures formed therein, and
the auto focus actuator includes a plurality of screw bosses configured to fit into the apertures and inhibit particles from the screw bosses from falling on the image sensor as the auto focus actuator is mounted to the PCB.

6. A webcam comprising:
an external housing; and
a lens system disposed in the external housing, wherein:
the lens system includes:
a lens including a portion that is configured to collect light,
a printed circuit board (PCB),
an image sensor mounted on the PCB, and
an auto focus actuator mounted on the PCB; and
a lens cap disposed in the external housing and configured to surround the lens system,
wherein a gap is formed between the lens system and the lens cap, and between the auto focus actuator and the lens cap,
the PCB includes a plurality of apertures formed therein,
the auto focus actuator includes a plurality of screw bosses configured to fit into the apertures and inhibit particles from the screw bosses from falling on the image sensor as the auto focus actuator is mounted to the PCB, and
the external housing has an exterior surface and the lens cap includes an annular portion that is configured to extend at least partially beyond the exterior surface.

7. The webcam of claim 6, wherein the screw bosses have a height that is less than a depth of the apertures.

8. The webcam of claim 7, wherein a void is created by the screw bosses fitted into the apertures and the void is configured to collect debris from the screw bosses as screws are screwed into the screw bosses.

9. The webcam of claim 6, wherein the lens cap has an aperture formed therein proximate to the lens and configured to pass light through the aperture to the lens.

10. The webcam of claim 9, wherein the lens cap includes a coupling system to couple the lens cap to the lens system.

11. The webcam of claim 10, wherein the coupling system includes a set of hooks.

12. The webcam of claim 3, wherein the coupling system includes a set of hooks configured to engage with the auto focus actuator.

13. The webcam of claim 10, wherein the coupling system includes a set of hooks configured to engage with the auto focus actuator.

* * * * *